United States Patent [19]

Tucker, Jr.

[11] 3,852,418
[45] Dec. 3, 1974

[54] EMBALMANT
[76] Inventor: Eli Jordan Tucker, Jr., Memorial Professional Bldg., Suite 1007, Houston, Tex. 77002
[22] Filed: Oct. 18, 1971
[21] Appl. No.: 190,122

Related U.S. Application Data
[63] Continuation-in-part of Ser. No. 532,011, Nov. 30, 1965, abandoned, and a continuation-in-part of Ser. No. 797,681, Feb. 7, 1969, abandoned.

[52] U.S. Cl. ................................. 424/75, 424/337
[51] Int. Cl. ............................................. A10n 1/00
[58] Field of Search ................ 424/3, 7, 9, 337, 75

[56] References Cited
UNITED STATES PATENTS
2,581,523   1/1952   Ferrari ..................................... 424/3
3,549,770   12/1970  Herschler et al. .................. 424/337
3,551,554   12/1970  Herschler ............................... 424/7

FOREIGN PATENTS OR APPLICATIONS
945,427   12/1963   Great Britain

OTHER PUBLICATIONS
Bodkin, Am. J. Surg., 88(3), 367–369, 374–377, Feb. 1954.
Pottz et al., Am J. Clin. Path., 42(5), 552–554, (1964).

Primary Examiner—Albert T. Meyers
Assistant Examiner—Douglas W. Robinson
Attorney, Agent, or Firm—Kenneth H. Johnson

[57] ABSTRACT

Hematoxylin, a powder, is placed in solution in dimethyl sulfoxide, to form a composition or combination adapted to be injected in veins and arteries, as an embalmant, in one usage, as in scientific taxidermy, so that the red coloring of the hematoxylin may be traced therein.

4 Claims, No Drawings

EMBALMANT

This application is a continuation-in-part of application Ser. No. 532,011, filed Nov. 30, 1965, and now abandoned, and also it is a continuation-in-part of application Ser. No. 797,681, filed Feb. 7, 1969, now abandoned.

BACKGROUND OF THE INVENTION

The prior art is singularly silent on any chemical combinations in anticipation of the product claimed herein. Herschler U.S. Pat. No. 3,549,770 deals with the therapeutic administration of dimethyl sulfoxide to human and animal subjects. Ferrari U.S. Pat. No. 2,581,523 shows the use of hematoxylin in staining slides of smears. Crown Zellerbach holds a British Pat. No. 945,427, which teaches the use of a polymer-compound agent in admixture with dialkyl sulphoxide as a pesticide.

In publications, Conn's Biological Stains mentions the use of indigocarmine as a collagen fiber stain, but this stain, as only applicable to collagen, is of infinitesimal comparison with hematoxylin, which carries stain or acts as a tracer in the collagen, intracellular and intervascular tissue of a body, or in 100 percent thereof, while the collagen comprises only about 2 percent of body tissue, the interstitial part.

SUMMARY OF THE INVENTION

The invention applies the composition of hematoxylin and dimethyl sulfoxide as an embalmant or preservative which will act through the intervascular and intercellular tissue, and collagen, or substantially 100 percent of a body, to serve as, say, an embalmant in scientific taxidermy The invention thus has object to provide a chemical combination or physical combination of ingredients in the form of an embalmant, cats being cited as used for control and test bodies.

Also, it is an object of the invention to provide a combination or composition, to serve as an embalmant, with the red color of the hematoxylin serving as a tracer or delineator, as may be required in some bodies embalmed for scientific taxidermy.

The part of the invention that is presented in this application as new resides in the discovery that the combination of hematoxylin, a powder, dissolved in dimethyl sulfoxide, as solvent, provides a preservative or embalmant, which will combat necrosis. Also, the hematoxylin as thus applied in solution with dimethyl sulfoxide, will impart its red color to all areas penetrated by the fluid solution, as may be desired in certain types of taxidermy, as taxidermy for scientific purposes. The approximate proportions of dimethyl sulfoxide to hematoxylin is 1.75 to 5.5 c.c. of dimethyl sulfoxide to 1 gram of hematoxylin.

Each of two black cats were thus sacrificed by ether doses, one cat being used as a control and the other cat being used for test. The control cat was simply given ether in quantity to cause death by excess anesthesiation. Just before the test cat's heart quit beating under the ether, it was injected with 10 c.c. of a solution obtained by dissolving 25 grams of hematoxylin, a powder, in enough dimethyl sulfoxide to make a total solution of 75 c.c. Thus the last heart beats of the test cat distributed the solution through its body.

After three days in plastic bags, the dead cats were observed, and the general outward appearance of the test cat showed substantially much greater preservation and fixed animation than the control cat in which marked necrosis had set in. As a matter of fact the test cat appeared as it appeared as just put to death. Sections from the heart, lung, kidney and liver of each cat were then taken, with the sections being placed in formation. The test cat sections showed substantial preservation or in fact practically no deterioration or necrosis while the control cat sections showed substantial necrosis.

Since the basic combination of hematoxylin and dimethyl sulfoxide may be required in various amounts, it has been found practicable to market the product in sterile sealed glass ampules over a range of sizes. A satisfactory marketable strength can be 25 grams of hematoxylin powder in enough fluid dimethyl sulfoxide to make 75 c.c., and the size or volumes of ampules can range from 1 c.c. to 50 c.c. in capacity.

The invention may be practiced with various combinations of hematoxylin and dimethyl sulfoxide, or equivalent solvents. The disclosure hereinabove is thus illustrative, and the claims are directed to the bounds of the disclosure.

I claim:

1. An embalmant composition for intravenous injection consisting essentially of hematoxylin and dimethyl sulfoxide in a ratio of 1.75 to 5.5 cc of dimethyl sulfoxide per gram of hematoxylin.

2. The composition according to claim 1 wherein the ratio of dimethyl sulfoxide to hematoxylin is 1.75 to 5 cc to 1 gram.

3. The composition according to claim 2 wherein the ratio of dimethyl sulfoxide to hemotoxylin is 2 cc to 1 gram.

4. The composition according to claim 2 wherein the solution consists of 25 grams of hematoxylin in enough dimethyl sulfoxide to make a total solution of 75 c.c.

* * * * *